United States Patent
Javidan

(10) Patent No.: US 9,454,829 B2
(45) Date of Patent: Sep. 27, 2016

(54) SYSTEMS AND METHODS FOR OBTAINING A DIGITAL WALLPAPER

(71) Applicant: Motorola Mobility LLC, Libertyville, IL (US)

(72) Inventor: Ali Javidan, Sunnyvale, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 166 days.

(21) Appl. No.: 13/830,603

(22) Filed: Mar. 14, 2013

(65) Prior Publication Data
US 2014/0267383 A1    Sep. 18, 2014

(51) Int. Cl.
| | |
|---|---|
| G06T 11/00 | (2006.01) |
| H04M 1/02 | (2006.01) |
| H04M 1/725 | (2006.01) |
| H04M 1/03 | (2006.01) |

(52) U.S. Cl.
CPC ............ *G06T 11/00* (2013.01); *H04M 1/0283* (2013.01); *H04M 1/72544* (2013.01); *H04M 1/72575* (2013.01); *H04M 1/035* (2013.01); *H04M 1/72558* (2013.01)

(58) Field of Classification Search
CPC ......... G06T 1/00; G06T 19/00; G06T 11/00; G06F 3/0484; H04B 1/3888; H04B 1/3816; H04M 1/0283; H04M 1/72525; H04M 1/72527; H04M 1/7253; H04M 1/72544; H04M 1/72558; H04M 1/72575; H04M 1/035
USPC .................. 455/575.1, 575.8, 418, 557, 558; 715/764–765, 866; 345/619
See application file for complete search history.

(56) References Cited

U.S. PATENT DOCUMENTS

| | | | |
|---|---|---|---|
| 7,113,196 B2 | 9/2006 | Kerr | |
| 8,180,075 B2 | 5/2012 | Nelson et al. | |
| 2003/0017848 A1* | 1/2003 | Engstrom et al. | 455/558 |
| 2003/0036362 A1* | 2/2003 | Buesseler et al. | 455/90 |
| 2003/0186729 A1* | 10/2003 | Engstrom et al. | 455/575.8 |
| 2004/0018863 A1* | 1/2004 | Engstrom et al. | 455/575.8 |

(Continued)

FOREIGN PATENT DOCUMENTS

EP    2341695 A2    7/2011

OTHER PUBLICATIONS

Object Geometries, "3D Printed iPhone Case with Moving Gears", http://www.youtube.com/watch?NR=1&feature=endscreen&v=cev_zcXJw, Oct. 2, 2012, 1 page.

(Continued)

*Primary Examiner* — Ke Xiao
*Assistant Examiner* — Jed-Justin Imperial
(74) *Attorney, Agent, or Firm* — Marshall, Gerstein & Borun LLP

(57) ABSTRACT

Systems and methods are provided for controlling functions associated with a back housing (104) that is attached to an electronic device (100). According to one aspect, the electronic device detects (902) attachment of the back housing, retrieves (904) information from the back housing, examines (906) the retrieved information to identify an aesthetic element of the back housing, and displays (910) a graphical representation of the aesthetic element as a digital wallpaper of the electronic device. In some embodiments, attachment of the back housing to the electronic device triggers performance (914) of a function associated with a functional element of the back housing.

17 Claims, 15 Drawing Sheets

(56) References Cited

U.S. PATENT DOCUMENTS

| | | | |
|---|---|---|---|
| 2004/0125782 A1* | 7/2004 | Chang | 370/338 |
| 2004/0203486 A1* | 10/2004 | Shepherd et al. | 455/90.1 |
| 2005/0026661 A1 | 2/2005 | Rheenen et al. | |
| 2007/0011724 A1* | 1/2007 | Gonzalez et al. | 726/4 |
| 2007/0024916 A1* | 2/2007 | Choi | 358/3.29 |
| 2008/0147964 A1* | 6/2008 | Chow | G06F 21/34 711/103 |
| 2009/0055536 A1* | 2/2009 | Jo | G06F 9/4411 709/227 |
| 2011/0010470 A1* | 1/2011 | Hulbert | G06F 3/0219 710/13 |
| 2011/0159924 A1* | 6/2011 | Gonzalez et al. | 455/557 |
| 2012/0035989 A1* | 2/2012 | Abel et al. | 705/14.1 |
| 2012/0052929 A1* | 3/2012 | Thammasouk et al. | 455/575.1 |
| 2014/0140530 A1* | 5/2014 | Gomes-Casseres et al. | 381/77 |

OTHER PUBLICATIONS

International Search Report for Application No. PCT/US2015/05197, mailed Jul. 16, 2014.

* cited by examiner

SYSTEMS AND METHODS FOR OBTAINING A DIGITAL WALLPAPER

FIELD

This application generally relates to digital wallpapers on electronic devices. In particular, the application relates to platforms and techniques for obtaining a digital wallpaper for an electronic device based on a housing component of the device.

BACKGROUND

Many current electronic devices (such as, for example, personal computers, mobile communications device, personal digital assistants (PDAs), tablets, e-readers, portable media players, portable gaming devices, etc.) display a digital wallpaper as the background image of the graphical user interface of the device. For example, a digital wallpaper can appear as the background against which icons and menu options are displayed on the "home" screen of a mobile communications device. The wallpaper image can be a photographic image, a montage of photographs and other images, a patterned background, a single-colored background, or any other type of image.

The digital wallpaper can be customized by the user, or can be automatically selected by the operating system of the electronic device. Often times, a user will select a digital wallpaper with a specific purpose in mind: to reflect a mood of the user; to advocate a certain viewpoint; to provide motivation towards a goal; to display pictures of loved ones, favored works of art, preferred scenery, or other meaningful images; to advertise an affinity for, or affiliation with, a certain group or region (e.g., a sports team, a business or business-related group, a social group, a hometown, etc.); or for any number of other reasons.

The digital wallpaper is a popular choice for user-configuration because it is one of a few customizable features on an electronic device that can be repeatedly appreciated by the user, or others around her, while using the device. Another example of such a feature is the customizable ringer on, for example, a mobile communications device. On some electronic devices, a back housing component of the device may also be customized by the user. For example, a graphical image chosen by the user may be imprinted onto the back housing. Many users place a lot of time and effort into, and/or draw great significance from, the design of their back housings, much like the digital wallpaper. However, due to its placement on the electronic device, the user is unable to view the back housing design while actually using the device. As a result, at least some of the excitement and appeal typically associated with having a customized back housing may be diminished by the very function of this housing component.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and ad vantages of those embodiments.

DETAILED DESCRIPTION

Figure 1:
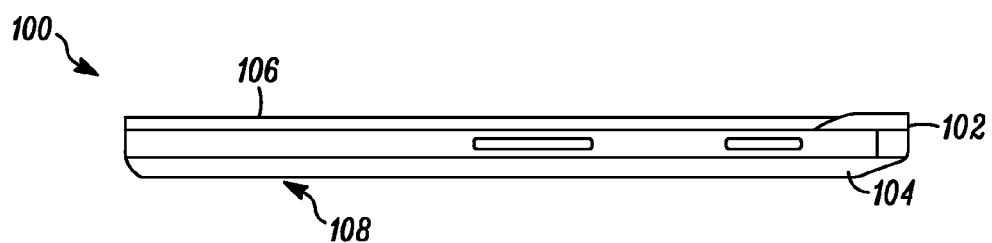
FIG. 1 illustrates an example electronic device in accordance with some embodiments.

Systems and methods are disclosed for obtaining a digital wallpaper of an electronic device based on a housing component of the electronic device. For example, the electronic device may have a rear or back housing component that can be detached from, and reattached to, a main body of the electronic device. The back housing component may be customized to include thereon an aesthetic element, such as, e.g., a graphic design, logo, shape, etc. The systems and methods disclosed herein provide techniques for detecting whether the back housing is attached to the electronic device; and if it is, retrieving information about the back housing, including the aesthetic element, from one or more sources; and displaying a digital wallpaper on the electronic device that is derived from, based on, or otherwise related to the aesthetic element of the back housing. For example, the aesthetic element may be a photograph that is imprinted onto the back housing, and the digital wallpaper may be a mirror image of the photograph. In another example, the back housing may include a three-dimensional aesthetic element, such that one or more portions of the aesthetic element protrudes from a surface of the back housing, and the digital wallpaper may be a two-dimensional graphical representation of the aesthetic element (e.g., a photograph of the actual aesthetic element, a computer-generated drawing of the aesthetic element, or other two-dimensional representation).

According to some embodiments, in addition to the aesthetic element, the back housing may also have a functional aspect. As with the aesthetic element, information about the functional aspect of the back housing may be retrieved by the electronic device from one or more sources. In addition, upon detecting attachment of the back housing to the electronic device, the electronic device may be triggered to perform a function defined by the retrieved information and related to the functional aspect. For example, attachment of a back housing that has an embedded heartrate monitor may cause the electronic device to automatically launch a health monitoring software application that receives heart rate readings from the heartrate monitor. As another example, attachment of a back housing that includes an audio speaker cavity may cause an audio player of the electronic device to be configured according to predefined settings that are ideal for porting to the audio cavity, predefined settings being included in the information received in connection with the back housing.

Thus, the systems and methods described herein provide a back housing that has increased aesthetic appeal, as well as added functionality in the form of causing display of a digital wallpaper that is related to the back housing design and/or causing the electronic device to perform a function related to the back housing. Displaying a digital wallpaper that is based on the back housing also enables the user to appreciate the customized back design while looking at the front of the electronic device.

FIG. 1 depicts an example electronic device 100 consistent with some embodiments. It should be appreciated that the electronic device 100, as depicted, is merely an example and can include various combinations of hardware and/or software components. According to some embodiments, the electronic device 100 may be a mobile computing device, such as, for example, a smartphone or any other type of mobile communications device, a tablet, an e-reader, a portable gaming device, a portable media player, a personal digital assistant, a laptop computer, a desktop computer, or any other electronic device that can have a user-configurable back housing component.

In FIG. 1, the electronic device 100 is depicted as a mobile computing device having a main body or housing 102 that houses a majority of the electronic components included in the mobile computing device 100 and a back housing 104 that may be detachably coupled to a back side of the main housing 102 (also referred to herein as front housing 102). The device used to attach the back housing 104 to the front housing 102 can be any of a number of known attachment mechanisms, including but not limited to, a mechanical device (e.g., snap-on), magnets, hook and loop, a friction-based device, adhesive, etc. The illustrated mobile computing device 100 further includes a display screen 106 on a front face of the device 100. The mobile computing device 100 may also include other components, such as, for example, one or more speakers (e.g., speaker 216 in FIG. 2B), one or more cameras (e.g., back camera 224 in FIG. 2A), and/or an additional display (e.g., back display 305 in FIG. 3A). As shown, the back housing 104 and the display screen 106 are positioned on opposite sides of the mobile computing device 100. As a result, the user cannot properly view both the aesthetic component 108 and the display screen 106 at the same time.

Figure 2A:
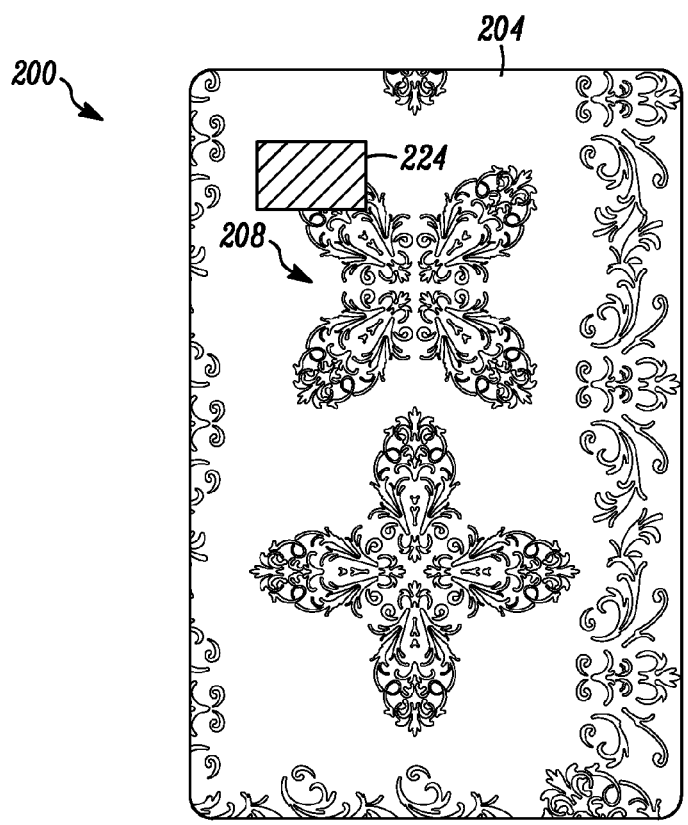
FIG. 2A illustrates an example back view of an electronic device in accordance with some embodiments.

According to some embodiments, the back housing 104 can include a user-customized aesthetic element, such as, for example, aesthetic component 208 in FIG. 2A. The aesthetic element can be designed to include any shape, structure, design, and/or pattern. According to some embodiments, the aesthetic element can be two-dimensional (e.g., aesthetic component 208 in FIG. 2A) and/or three-dimensional (e.g., aesthetic component 408 in FIG. 4A). As an example, the aesthetic element may be derived from, or created based on, one or more of a photograph, a logo or design, a pattern, a computer graphic, a string of text, generated artwork (e.g., a hand drawing or sketch, a painting, a computer-generated illustration, etc.), a three-dimensional object (e.g., a mask, a sculpture, a figurine, a model, etc.), or any other image or object. In addition, the aesthetic element may be designed to include one or more colors, the selection of colors depending on a variety of factors, such as, for example, the color(s) of the image or object on which the aesthetic element is based, the colors available for the technique used to manufacture the back housing 104, the color(s) of the front housing 102, and/or the color(s) selected by the user. As will be appreciated, in some instances, the aesthetic element may include only a portion of the underlying image or object. For example, if the aesthetic element is based on a three-dimensional object, the aesthetic element may be designed to include only a front half of the object, a side profile of the object, or any other section of the object.

Figure 4A:
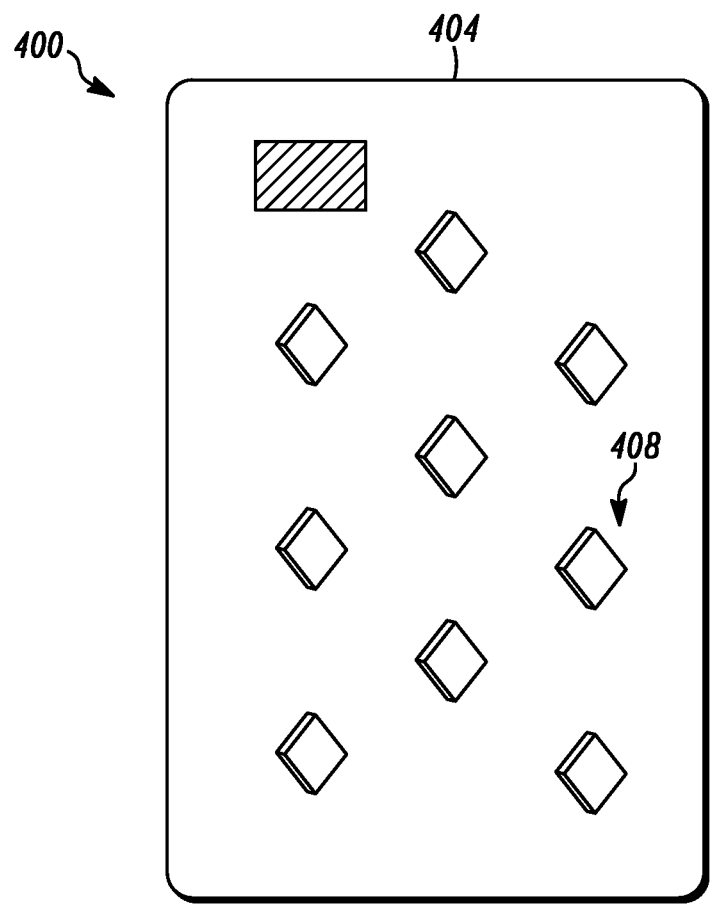
FIG. 4A illustrates an example back view of an electronic device in accordance with some embodiments.

The aesthetic element can be attached to, included on, or otherwise applied to an outer surface of the back housing 104 in any of a number of ways. According to some embodiments, the aesthetic component 108 may be integrated or incorporated into the back housing 104, so that the aesthetic component 108 and the back housing 104 form one unit. For example, FIG. 2A illustrates an example mobile computing device 200 that has a two-dimensional aesthetic component 208 printed onto a majority portion of the outer surface of a back housing 204. As another example, FIG. 4A illustrates an example mobile computing device 400 that has a three-dimensional aesthetic component 408 that is molded into a back housing 404. Any of a number of manufacturing techniques may be used to create a back housing that has an integrated aesthetic component, including, for example, imprinting, etching, engraving, moulding, and/or three-dimensional (3D) printing.

Figure 5A:
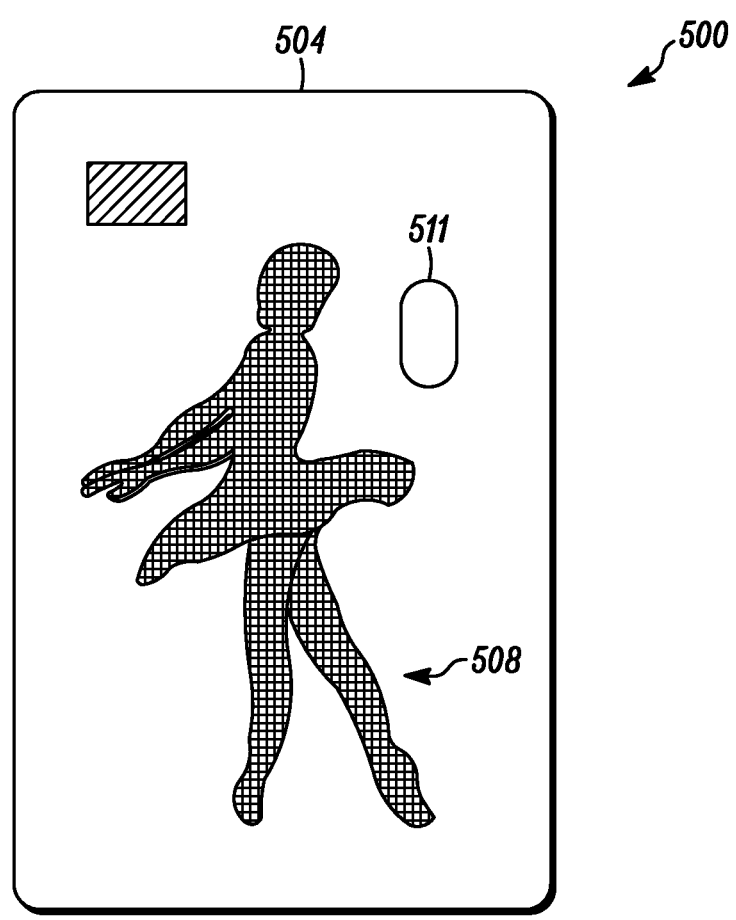
FIG. 5A illustrates an example back view of an electronic device in accordance with some embodiments.

According to other embodiments, the back housing 104 may be manufactured independently of the aesthetic component 108, and the aesthetic component 108 may be affixed to the back housing 104 afterwards, for example, as an "add-on" accessory or embellishment. For example, FIG. 5A illustrates an example mobile computing device 500 including a back housing 504 with an aesthetic component 508 that has an adhesive backing for attaching the aesthetic component 508 to an outer surface of the back housing 504. According to the illustrated embodiment, the aesthetic component 508 may be a sticker that is printed with the image of a ballet dancer. Any of a number of other attachment mechanisms and/or devices may be used to affix the aesthetic component 508 to the back housing 504, including hook and snap, magnets, and/or a slot, pouch, or other holder for securing the aesthetic element to the back housing 504. According to some aspects, the aesthetic component 508 may be removable, such that the aesthetic component 508 can be replaced with a new aesthetic aspect without replacing the entire back housing 504.

According to some embodiments, a user may create the customized back housing 104 and/or the aesthetic component 108 using a 3D printer (e.g., at a 3D printing station or booth). For example, the 3D printer may be in communication with a computer, over a wireless or wired connection, and the user may upload the image(s) that the user wishes to include in the aesthetic element (e.g., a personal photograph, a selected logo/design, generated artwork, etc.) to the computer. The user may select whether to print a back housing with an integrated aesthetic element, or whether to print an aesthetic component that can be added to an existing back housing. In another example, the user may place an order for a customized back housing and/or aesthetic component with a third-party vendor. For example, the third-party vendor may be an online company that offers a web-based customization software for designing the back housing and/or aesthetic component over the Internet. The third-party vendor may utilize 3D printing technology to generate the customized back housing, and/or may use other manufacturing techniques.

Figure 3A:
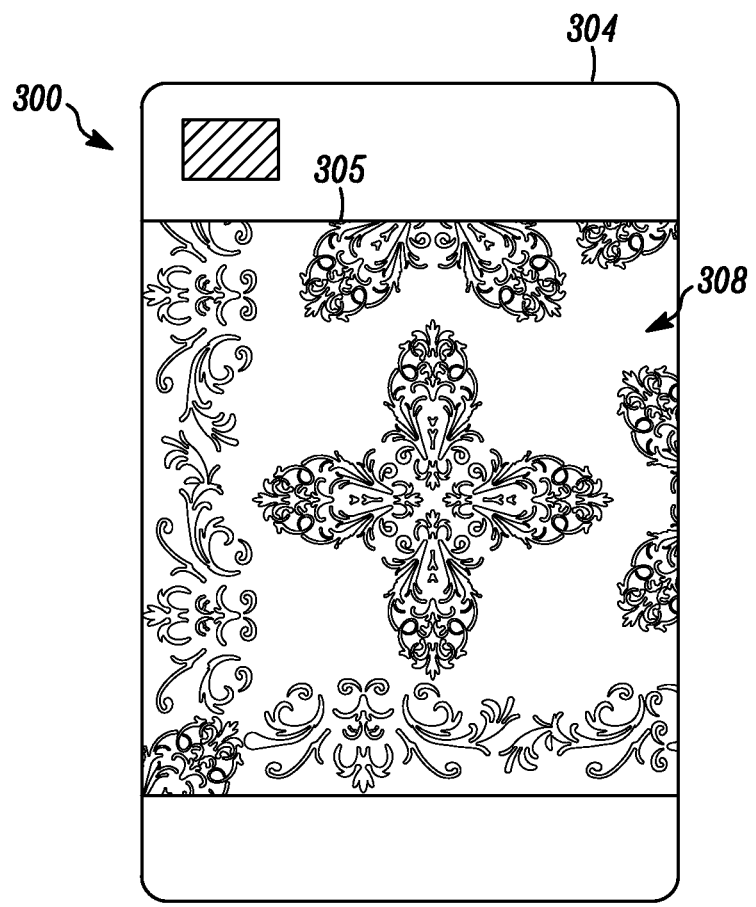
FIG. 3A illustrates an example back view of an electronic device in accordance with some embodiments.

According to some embodiments, the back housing 104 may include a display device that is configured to display a dynamic or adjustable aesthetic component 108. That is, the image displayed on the back housing display can be changed or updated without replacing the back housing itself. For example, FIG. 3A illustrates an example mobile computing device 300 that includes a back display 305 configured to display an aesthetic component 308. The back display 305 may utilize a number of known display technologies, including, but not limited to organic light-emitting diode (OLED) and electrophoretic ink ("e-ink"), to display a selected image as the aesthetic component 308. According to some embodiments, the back display 305 may be configured to display a series of images as the aesthetic component 308, such that the aesthetic component 308 appears, for example, to be a moving picture, to have flashing or blinking lights, and/or to have continuously updated images. In embodiments that use e-ink technology to display the aesthetic component 308, the back display 305 may be very thin, like a sheet of cardstock or other paper.

If the aesthetic element is based on an object that is not in a digital format, the underlying object may need to be converted into an appropriate computer-readable format that, for example, is readable by the manufacturing machine being used to make the aesthetic component and/or back housing. For example, to create an aesthetic component based on a painting, the painting may need to be photographed or scanned by a digital photo scanner to create a digital image file that can be read by the manufacturing machine (e.g., JPEG, GIF, TIFF, PNG, etc.). As another example, to create an aesthetic component based on a sculpture, the sculpture may need to be scanned by a three-dimensional scanner to digitally acquire a 3D model. In some embodiments, a 3D computer graphics software application, such as CAD (computer aided design), animation modeling software, and other known 3D modelers, may be used to create the 3D model. As will be appreciated, the 3D model may be created in different input file formats (e.g., STL, PLY, VRML, or WRL) depending on its source and/or the manufacturing machine for which it is intended.

As discussed above, the aesthetic element of a back housing may be used to generate a customized digital wallpaper. According to some embodiments, the image that is displayed as the digital wallpaper may be a graphical representation of the aesthetic element of the back housing. For example, FIG. 2A. shows a back side of the mobile computing device 200, which includes the back housing 204 with aesthetic component 208, and FIG. 2B shows a front side of the mobile computing device 200, which includes a display 206 configured to display a digital wallpaper 210 that is derived from the aesthetic component 208.

According to one embodiment, the same image or model file that is used to create the aesthetic component 208 can be displayed as the digital wallpaper 210. According to other embodiments, a separate image file may be created based on the aesthetic component 208 for the purpose of being used as the digital wallpaper 210. For example, a photograph of the aesthetic component 208 may be taken and displayed as the digital wallpaper 210. In embodiments where the aesthetic element was created from a 3D model file, the same model file may be converted into a 2D image file format that is acceptable for use as a digital wallpaper (e.g., JPEG, GIF, TIFF, PNG, PDF, etc.). In some embodiments, the image file for the digital wallpaper 210 can be created on a remote computer and then transferred to the mobile computing device 200. For example, as part of the process of ordering a customized back housing 204, the user may also create an image that is to be displayed as the digital wallpaper 210. According to some embodiments, the digital wallpaper 210 may be a "live" or dynamic wallpaper, such that the displayed image changes periodically, for example, in relation to a dynamically displayed aesthetic element, as described above with respect to FIGS. 3A and 3B.

According to some embodiments, the appearance and/or settings of the digital wallpaper 210 may be customized, edited, or otherwise modified according to one or more predetermined graphic settings. In some instances, one or more of the graphic settings may be preset by the manufacturer of the mobile computing device 200, the manufacturer of the back housing 204, and/or a software program running on the mobile computing device 200. For example, the predetermined graphic settings may be automatically configured based on a type of mobile computing device 200, a property of the display screen 206 of the device 200, and other factors related to the mobile computing device 200. Additionally, or alternatively, the predetermined graphic settings may be user-configured to achieve a desired visual effect for the digital wallpaper 210. The predefined graphic settings may relate to any of a number of image attributes, including, but not limited to, shrinking, stretching, cropping, tiling, and/or other re-sizing of the image, adjusting color tonality, brightness, sharpness, and/or other image properties, correcting blemishes, red-eye, and/or other image errors, etc. Further, the digital wallpaper image may be modified using image editing tools that are stored on the mobile computing device 200, on a network computer that is accessible via a network connection (e.g., using the Internet), and/or on any other computer that is in communication with the mobile computing device 200.

Figure 2B:
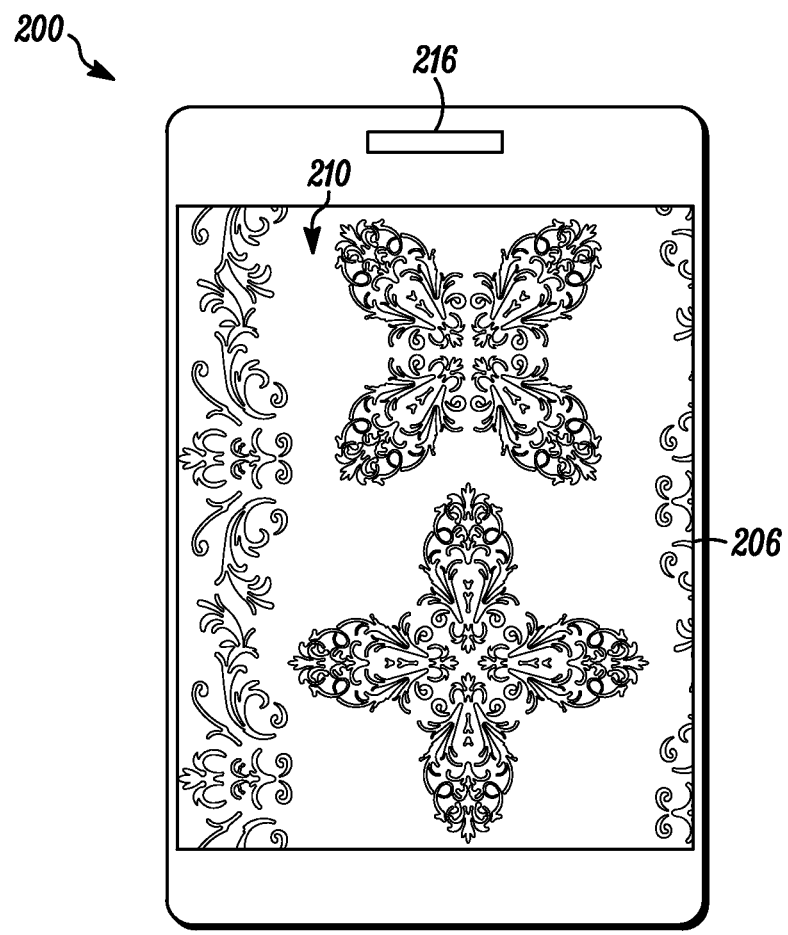
FIG. 2B illustrates an example front view of the electronic device shown in FIG. 2A.

To illustrate an example of a customized digital wallpaper, FIGS. 2A and 2B depict the digital wallpaper 210 as a mirror image of the aesthetic component 208. As used herein, the term "mirror image" includes a reflection of an original image about an imaginary center line, such that, for example, a left side of the original image appears on a right side of the mirror image and a right side of the original image appears on a left side of the mirror image (e.g., as one wing of a butterfly is a reflection of the other wing). For example, in FIG. 2A, a right side of the aesthetic component 208 appears on a left side of the digital wallpaper 210, and a left side of the aesthetic component 208 appears on a right side of the digital wallpaper 210. Displaying the mirror image of the aesthetic component 208 as the digital wallpaper 210, rather than the original aesthetic component 208, creates, for example, the illusion of being able to see the back housing 204 through the mobile computing device 200, as if the internal components of the device 200 do not exist. Thus, the user can have the impression of being able to view the customized back housing 208 while viewing the display 206 on the front of the electronic device 200.

Figure 3B:
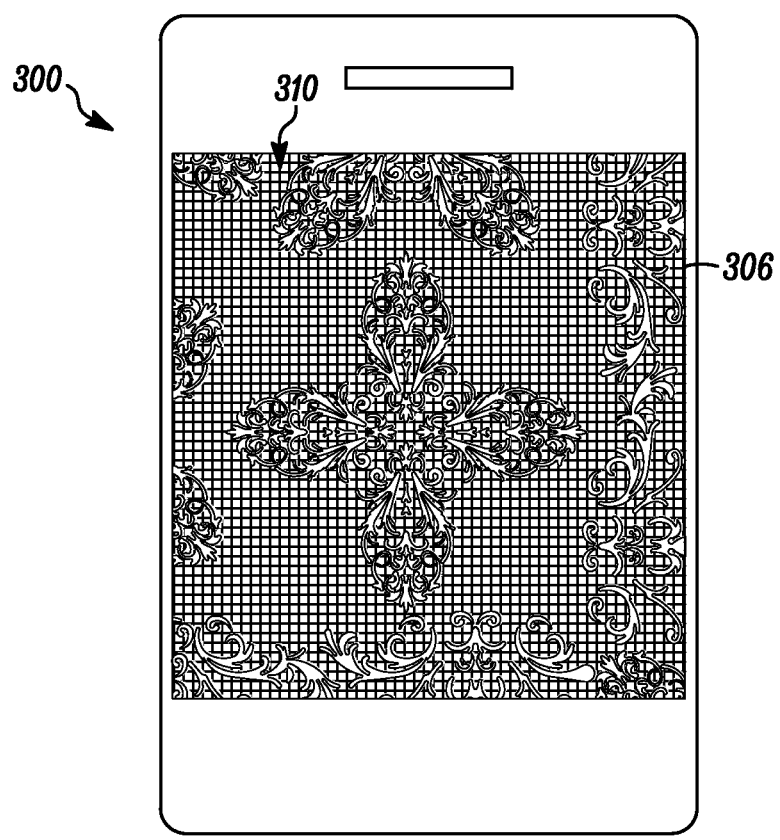
FIG. 3B illustrates an example front view of the electronic device shown in FIG. 3A.

As another example, FIG. 3B shows a digital wallpaper 310 displayed on a front display 306 of the mobile computing device 300, the digital wallpaper 310 being an inverted image of the aesthetic component 308 displayed on the back display 305 of the back housing 304. As used herein, the term "inverted image' includes an image in which the color tonalities of the original image are reversed, such that, for example, the positive elements of the original image are drawn as negative elements and the negative elements of the original image are drawn as positive elements (e.g., as the back of some types of oriental rugs are an inversion of the front of the rug). For example, in FIGS. 3A and 3B, the dark, or black-colored, portions of the aesthetic component 308 appear light, or white-colored, in the digital wallpaper 310, and the light portions of the aesthetic component 308 appear dark in the digital wallpaper 310. Displaying an inverted image of the aesthetic component 308 as the digital wallpaper 310 creates, for example, an oriental-rug effect, or an illusion of being able to see through the electronic device 300 to a backside of the back housing 308 as if the internal components of the electronic device 300 do not exist. In the illustrated embodiment, the digital wallpaper 310 is also presented as a mirror image of the aesthetic component 308, which further enhances the illusion of being able to view the backside of the back housing 308 while simultaneously operating the electronic device 300 from a front side.

Figure 4B:
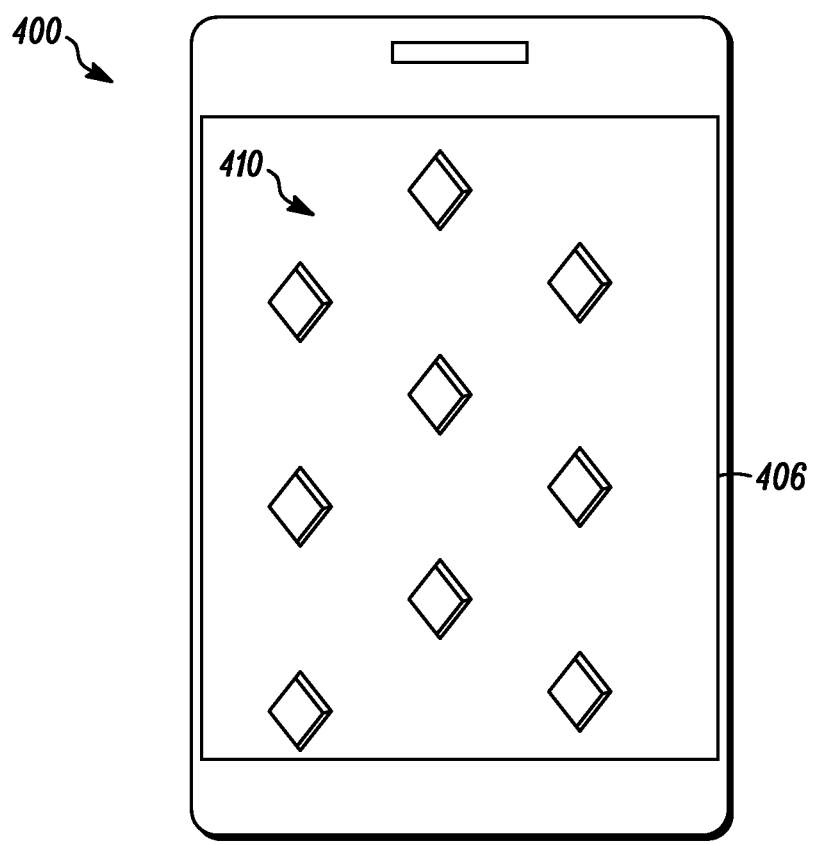
FIG. 4B illustrates an example front view of the electronic device shown in FIG. 4A.

As yet another example, FIG. 4A shows the back side of the mobile computing device 400, which includes the back housing 404 with the aesthetic component 408. As illustrated, the aesthetic component 408 includes a pattern of three-dimensional (3D) diamond-shaped protrusions that extend from the back housing 404. FIG. 4B shows a front side of the mobile computing device 400, which includes a display 406 configured to display a digital wallpaper 410 that is based on the aesthetic component 408. In the illustrated embodiment, the 3D protrusions of the aesthetic component 408 are presented as two-dimensional (2D) diamond shapes in the digital wallpaper 410. In other embodiments, for example, where the display 406 is capable of displaying a 3D image (e.g., a 3D display device), the digital wallpaper 410 may be displayed with a 3D effect, such that the diamond shapes appear to be sinking into the display 406. According to some embodiments, if the mobile computing device 400 includes a 3D display, a 3D digital wallpaper 410 may be displayed, regardless of whether the aesthetic component 408 itself is three-dimensional. According to one embodiment, the user may choose whether or not to display the digital wallpaper 410 with the 3D effect.

Figure 5B:
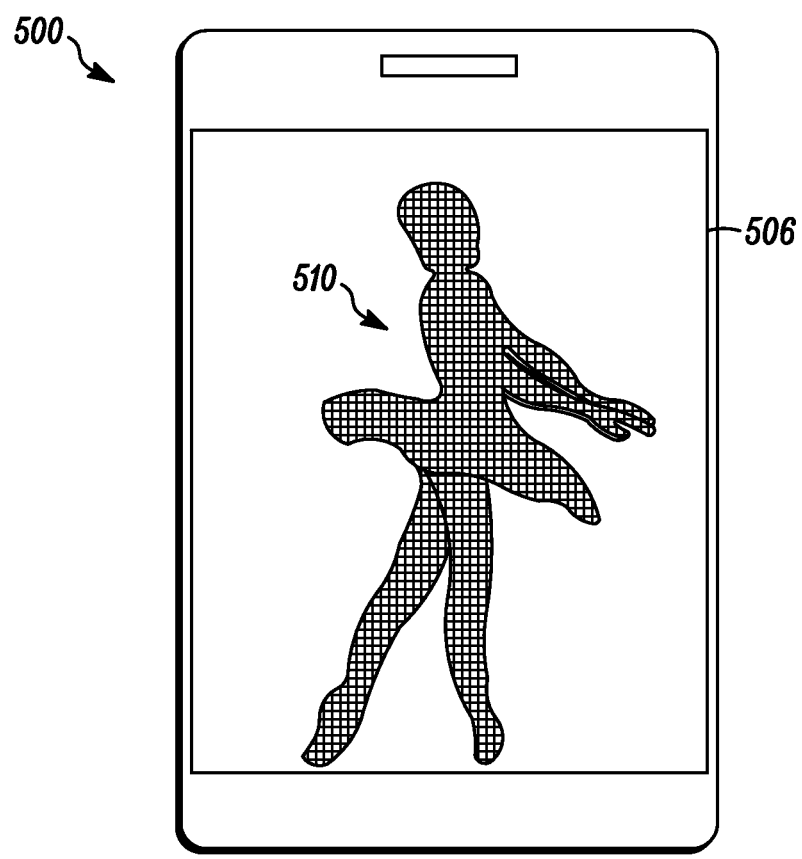
FIG. 5B illustrates an example front view of the electronic device shown in FIG. 5A.

Referring now to FIGS. 5A and 5B, according to some embodiments, the back housing 504 can include a functional aspect, in addition to the aesthetic element. The functional aspect may be a structural, electronic, or other physical component that is incorporated or embedded into the back housing 504. According to some embodiments, the functional aspect may be related to the aesthetic element. For example in FIGS. 5A and 5B, the mobile computing device 500 includes a functional component 511, such as a heart rate monitor, and the aesthetic component 508, which is a picture of a ballet dancer that is designed to motivate the user towards a certain fitness or health-related goal. The functional component 511 may assist, at least partially, in the fulfillment of the user's goal by, for example, monitoring the user's heart rate, while the user is engaged in a physical activity. To further motivate the user, the aesthetic component 508 can also be displayed as a digital wallpaper 510 on a display 506 of the mobile computing device, so that the user may be reminded of her goal while operating the mobile computing device 500.

In the illustrated embodiment, the functional component 511 is a fingertip heart rate monitor that includes an infrared transceiver that is configured to detect a change in the volume of blood that is pumping in an artery of a fingertip placed on the transceiver. The heart rate monitor 511 may further include a controller that is configured to determine the user's heart rate based on the changing blood volume. In another embodiment, the functional component 511 may be a heart rate monitor that includes two electrodes configured to measure electrical impulses in the user's heart when the user place a finger on each electrode. The measured impulses may be used to record an electro-cardiogram (ECG, EKG) and/or a heart rate reading. In either of the above embodiments, the reading(s) captured by the functional component 511 may be wirelessly communicated to the mobile computing device 500 using any of a number of wireless communication technologies, including, for example, Wi-Fi, radio-frequency identification (RFID), near field communication (NFC), or Bluetooth. According to one embodiment, the readings may be communicated to a remote computer (e.g., at a medical facility) over, for example, a wireless network connection for analysis by a physician or other medical professional.

According to some embodiments, the functional aspect of the back housing may be associated with performance of a function. In some instances, this function may be related to a software application that controls or receives inputs from the functional aspect, or otherwise runs in conjunction with the functional aspect. For example, attachment of the back housing 504 to the mobile computing device 500 can trigger execution of a computer program or software application that is configured to receive readings from the functional component 511. According to some embodiments, the software application may run in the foreground, such that the user can directly interact with the application, or in the background, such that the user need not interact with the application. Additionally, or alternatively, the function performed upon attachment of the back housing 504 can relate to configuring one or more settings of a component or software application included in the device 500 according to a preset profile that is associated with the functional component 511. In some instances, the preset profile may be pre-configured by the user, for example, as part of the process of designing the back housing 504. In some embodiments, the user may choose to manually manage the settings of the software application and/or device on the mobile computing device 500, either prior to or after attachment of the back housing 504. As another example, the user can choose to manually turn off the software application that may be automatically launched upon attachment of the back housing 504.

In the example embodiment of FIGS. 5A and 5B, the mobile computing device 500 includes a health monitoring software application that receives readings (e.g., ECG/EKG and/or heart rate readings) from the functional component 511. According to some embodiments, the health monitoring software application can be configured to analyze the received heart rate readings in relation to preset health- or fitness-related goals. The preset health/fitness goals may be preconfigured by the user based on one or more criteria (e.g., age, weight, gender, target heart rate, activity level, type of exercise, etc.) and may be part of a preset profile that is automatically implemented in the heath monitoring software upon attachment of the back housing 504 to the mobile computing device 500. Based on the readings received from the functional component 511, the health monitoring software application may provide feedback to the user, such as, for example, whether or not a preset goal is being met and/or whether a current level of activity is appropriate for a preset goal. According to one embodiment, the user can choose whether to receive feedback from the health monitoring software application, or whether to send the heart rate readings directly to a medical facility for analysis.

Figure 6A:
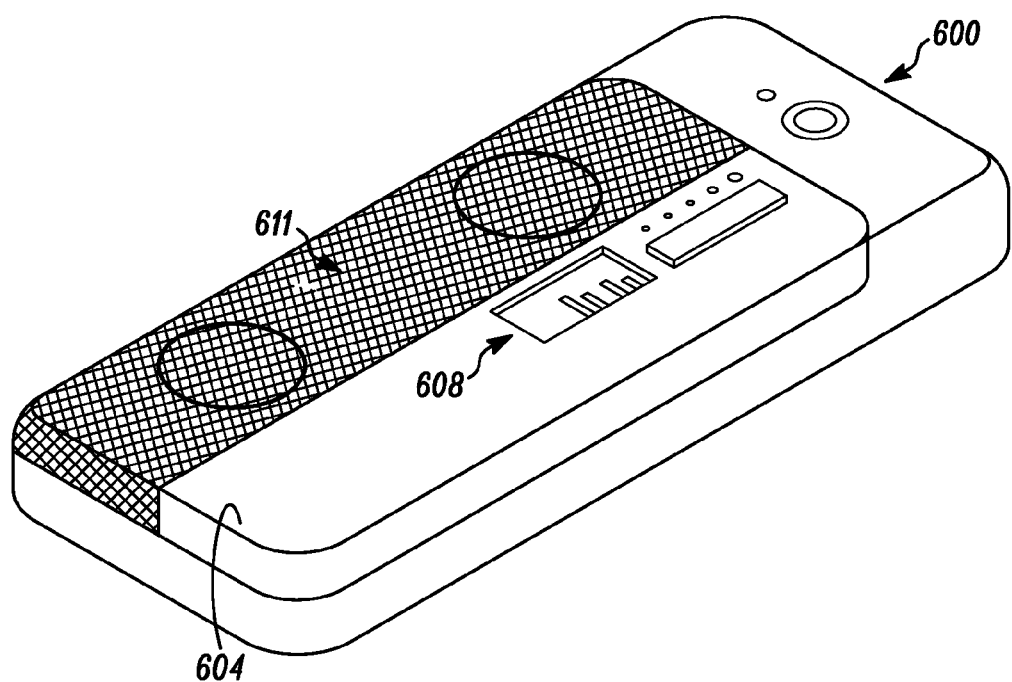
FIG. 6A illustrates a perspective view of an example electronic device having a back housing component in accordance with some embodiments.

As another example of a functional back housing, FIG. 6A shows a back side of an example mobile computing device 600 having an audio-related back housing 604 that includes an aesthetic component 608 and a functional component 611. In the illustrated embodiment, the aesthetic component 608 is a depiction of an equalizer, such as a graphic equalizer. The equalizer depiction (also referred to herein as equalizer graphic 608) includes multiple bars, each bar representing a selected signal gain for a specific frequency band (e.g., 60 Hz, 230 Hz, 910 Hz, etc.). According to one embodiment, the equalizer graphic 608 depicts generic gain selections that are included for aesthetic purposes only. According to other embodiments, the equalizer graphic 608 depicts predefined gain selections that are specifically associated with and/or tailored to the functional component 611.

Figure 6B:
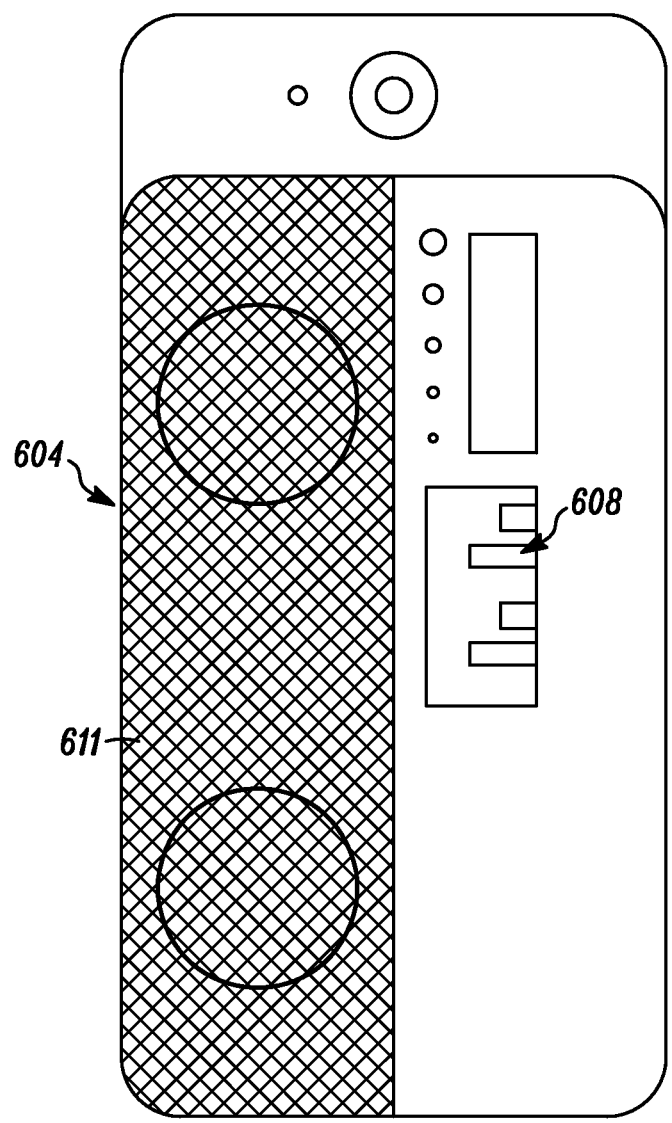
FIG. 6B illustrates an example back view of the back housing component shown in FIG. 6A.
Figure 6C:
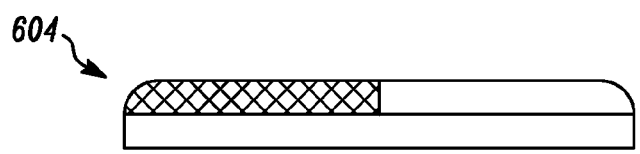
FIG. 6C illustrates an example bottom view of the back housing component shown in FIG. 6B.
Figure 6D:
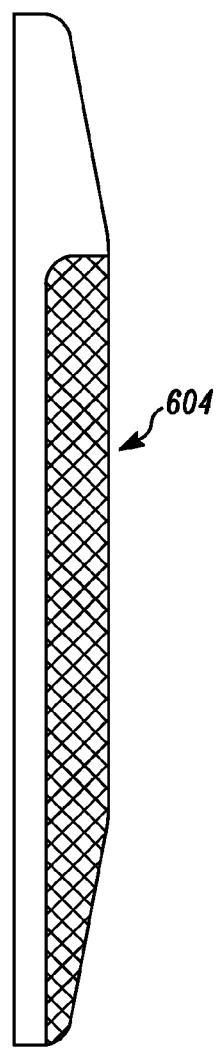
FIG. 6D illustrates an example side view of the back housing component shown in FIG. 6B.

As also illustrated in FIG. 6A, the functional component 611 can include an audio speaker cavity (e.g., a speaker baffle or port) that is embedded into a back side of the back housing 604. The mobile computing device 600 may include an audio speaker (not shown) on the back side of the device 600 that ports to the audio speaker cavity (also referred to herein as the back housing cavity 611). For example, U.S. Pat. No. 8,180,075, which is incorporated by reference herein in its entirety, discloses an electronic device housing that includes a bass reflex cavity, for example, in the battery door of the device, to enhance the low end frequency performance of the audio speaker of the device. FIGS. 6B, 6C, and 6D show additional views of the back housing 604. For example, FIG. 6B shows a back view of the back housing 604, FIG. 6C shows a bottom view of the back housing 604, and FIG. 6D shows a side view of the back housing 604.

Figure 6E:
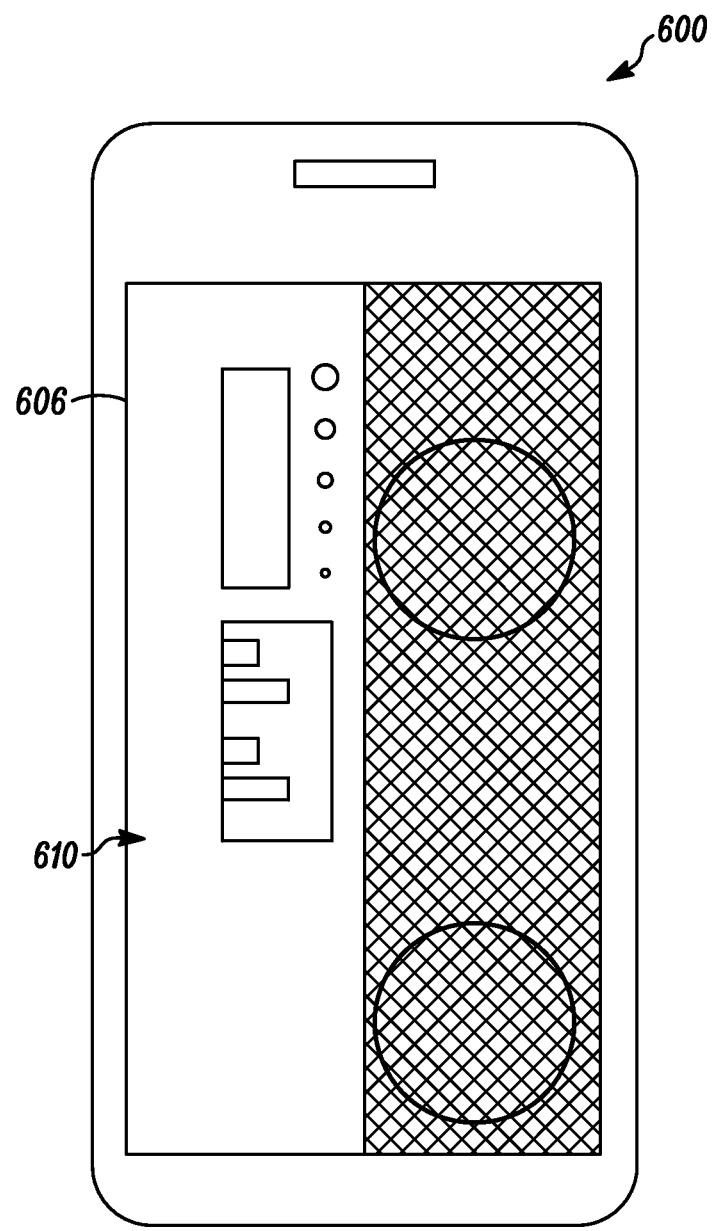
FIG. 6E illustrates an example front view of the electronic device shown in FIG. 6A.

FIG. 6E shows a front side of the mobile computing device 600, which includes a display 606 that is configured to display a digital wallpaper 610. As illustrated, the digital wallpaper 610 can include an audio-related image, such as the boombox image shown in FIG. 6E, that is related to, or derived from, the aesthetic component 608 of the audio-related back housing 604. According to some embodiments, the image displayed on the digital wallpaper 610 can include a graphical representation of an equalizer having frequency gain settings that correspond to the frequency gain data depicted in the aesthetic component 608 of the back housing 604.

According to some embodiments, the mobile computing device 600 may further include media player software, such as, for example, an audio player (e.g., capable of playing MP3, M4A, WAV, WMA, AIFF, FLAC, AAC, and other audio file formats), a podcast player, a digital radio player, an audiobook player, a multi-media player (e.g., capable of playing audio, video, radio, podcasts, etc.), and/or a video player (e.g., capable of playing MPEG, SWF, WMA, MP4, MOV, and other video file formats). Attachment of the back housing 604 to the mobile computing device 600 may cause automatic launch of the media player and/or automatic configuration of volume and/or equalizer settings within the media player according to a preset profile that is associated with the back housing 604. According to one embodiment, the preset profile may include the predefined gain selections that are depicted in the equalizer graphic 608.

Figure 7:
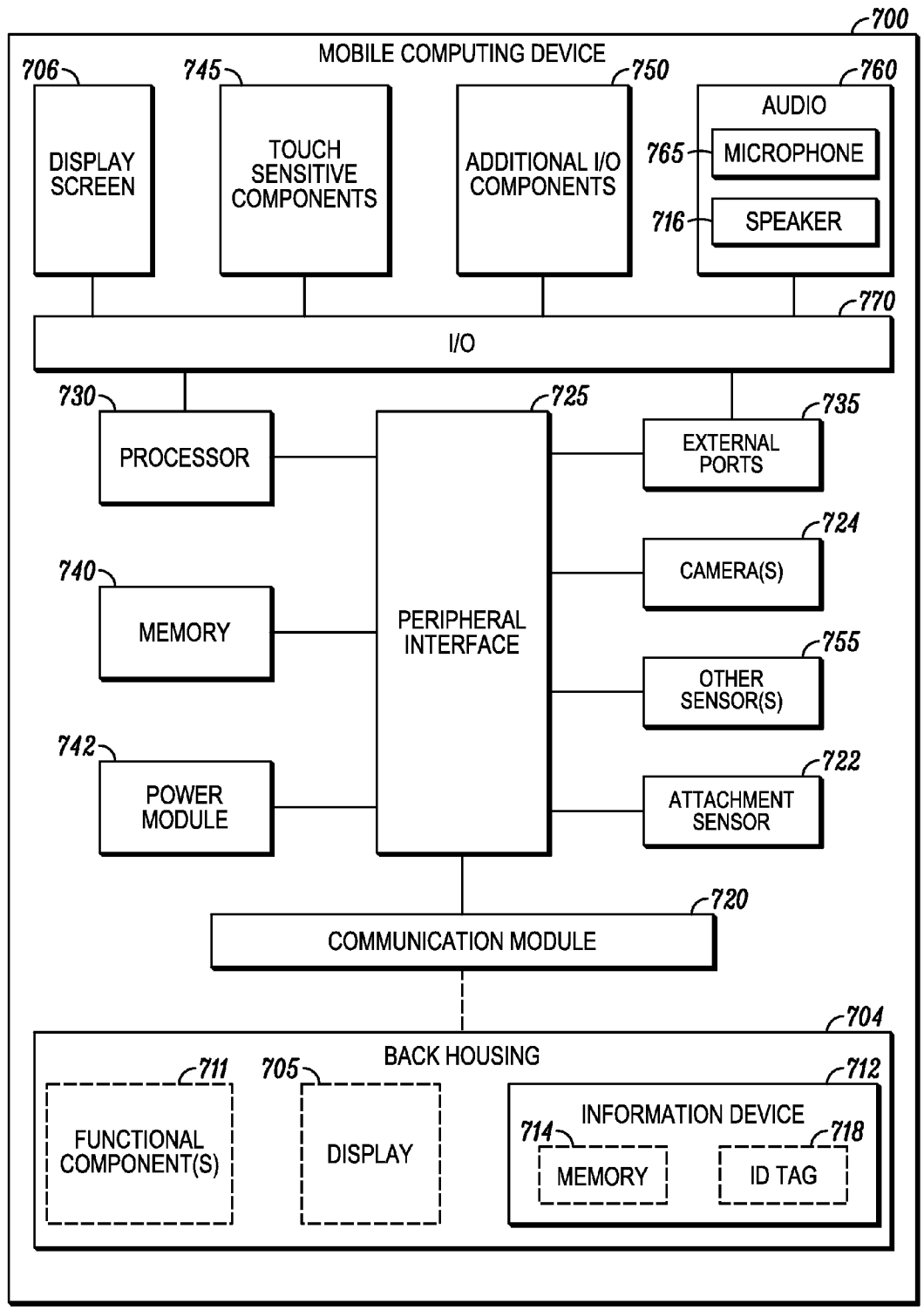
FIG. 7 is a block diagram of an example electronic device in accordance with some embodiments.

According to some embodiments, the back housing can include an information component that is configured to store data related to the back housing, including any aesthetic element and/or functional aspect included therein, and to communicate the stored data to the attached electronic device. For example, FIG. 7 illustrates an example mobile computing device 700 that has an attached back housing 704 with an included information device 712 configured to store data related to the back housing 704. The mobile computing device 700 further includes a communication module 720 that can be configured to retrieve data from the information device 712. For example, the communication module 720 may include one or more short-range transceivers configured to establish communication between the information device 712 and the mobile computing device 700 using any of a number of short-range wireless communication techniques (e.g., Bluetooth, radio frequency identification (RFID), near field communication (NFC), infrared, etc.). Based on the data received from the information device 712, a processor 730 of the mobile computing device 700 can identify information about an aesthetic element (not shown) of the back housing 704 and/or a functional component 711 of the back housing 704.

As illustrated, the information device 712 can include a memory device 714 (e.g., random access memory (RAM), read-only memory (ROM), erasable programmable read-only memory (EPROM, EEPROM, or Flash memory), or any other data storage device) and/or an identification (ID) tag 718 (e.g., an unpowered data chip including ROM, EPROM, EEPROM, or Flash memory). The memory 714 and/or the ID tag 716 can be configured to store aesthetic and/or functional information related to the back housing 704. The aesthetic information can determine the digital wallpaper that is displayed upon attachment of the back housing 704 to the mobile computing device 700. For example, the aesthetic information may include one or more image files (e.g., a graphical representation of the aesthetic element, a copy of the image file that was used to create the aesthetic element, an image preselected for the digital wallpaper during creation of the back housing, etc.), data that can be used to generate one or more images for display as the digital wallpaper (e.g., the predefined gain selections shown in FIG. 6A, color(s), dimension(s), and/or other image attributes, settings for creating a dynamic wallpaper, etc.), and/or other data related to the aesthetic element (e.g., metadata, file format type, etc.). Likewise, the functional information can determine the functions that are performed upon attachment of the back housing 704. For example, the functional information may include instructions or commands to execute one or more software application(s), implement one or more preset profile(s), and/or perform other function(s) upon attachment of the back housing 704. The functional information may also include other data related to the functional component 711 (e.g., metadata, identification of the functional component 711, etc.).

In other embodiments, all or a portion of the aesthetic and/or functional information can be contained in a database (e.g., a relational database or any other type of database architecture) that is not stored on the information device 712 itself. In such embodiments, the ID tag 718 of the information device 712 may store identifying information for accessing and retrieving the aesthetic and/or functional information from the remote database. For example, the identifying information may include a pointer, an identifier, a uniform resource locator (URL), or any other text for identifying a specific location in the back housing database 807 (see FIG. 8) that stores information related to the back housing 804. In this manner, the ID tag 718 may be used to indirectly retrieve aesthetic and/or functional information from the back housing 704.

According to some embodiments, the remote database may be stored in a memory 740 of the mobile computing device 700 and may be accessed using the processor 730. In other embodiments, the remote database may be stored in a remote location that can be accessed using a data network (e.g., network 819 of FIG. 8). In such embodiments, the communication module 720 may include one or more long-range transceivers that are configured to establish communication between the mobile computing device 700 and the data network using any of a number of communication technologies, (e.g., Ethernet, wireless networks (including Wi-Fi), satellite networks, cellular networks, etc.).

Figure 8:
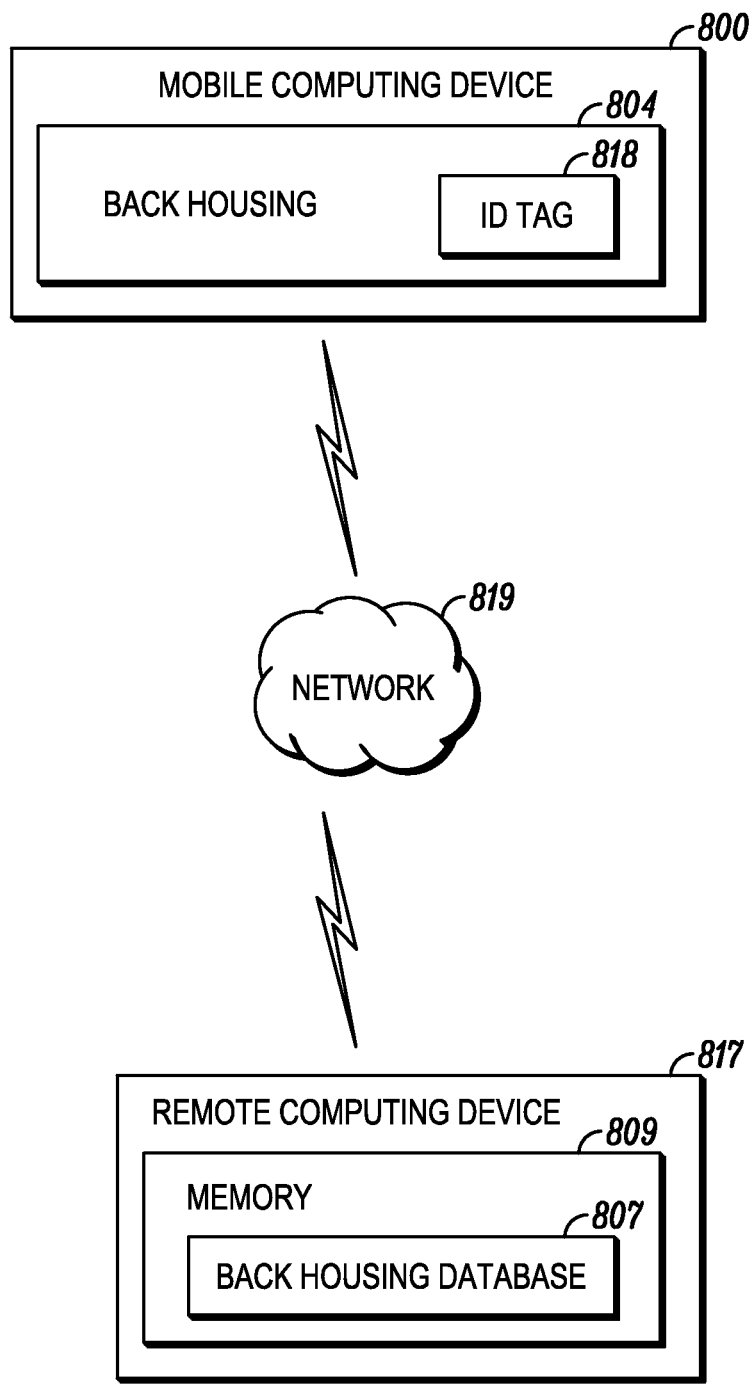
FIG. 8 is a diagram of an example network-based system in accordance with some embodiments.

In FIG. 8, an example mobile computing device 800 includes a back housing 804 that has an ID tag 818 configured to store identifying information (e.g., an identifier) for accessing a back housing database 807. The back housing database 807 can include aesthetic and/or functional information about the back housing 804 and can be stored in a memory 809 of a remote computing device 817. The mobile computing device 800 can be in wireless, or wired, communication with the remote computing device 817 over a network 819. The network 819 can include any type of data network, including but not limited to Ethernet, various types of wireless networks, satellite networks, and cellular networks. Upon attachment of the back housing 804, the mobile computing device 800 can retrieve the identifier from the ID tag 818 and send the identifier to the remote computing device 817 along with a request for the information that corresponds to the identifier. Using the identifier, the remote computing device 817 can retrieve the corresponding aesthetic and/or functional information from the back housing database 807 and send the information to the mobile computing device 800. The mobile computing device 800 can download and examine the received information to identify the aesthetic and/or functional elements of the back housing 807 and carry out one or more operations in accordance with the received information, as described herein.

Referring again to FIG. 7, the mobile computing device 700 can further include an attachment sensor 722 that is configured to detect attachment of, or very close proximity to, the back housing 704 to the mobile computing device 700 and send a corresponding trigger signal to the processor 730. The attachment sensor 722 can include electronic detection mechanisms (e.g., a light detecting sensor, a transducer, an infrared receiver or transceiver, or other proximity sensors) or mechanical detection mechanisms (e.g., a latch, a button, a switch, or other mechanical triggers). In some embodiments, the attachment sensor 722 can be configured for very short range detection (e.g., millimeter range) to help ensure that the back housing 704 is detected no earlier than just before attachment to the mobile computing device 700. According to one embodiment, the attachment sensor 722 can be a Hall effect sensor that detects magnetic attachment of the back housing 704 to the mobile computing device 700. Further, the attachment sensor 722 can be in electronic communication with the processor 730 and can be configured to send an attachment signal to the processor 730 upon detection of the back housing 704. Similarly, the attachment sensor 722 can detect detachment of the back housing 704 and send a corresponding detachment signal to the processor 730. The processor 730 may carry out certain tasks or functions depending on whether an attachment signal or a detachment signal is received from the attachment mechanism 722, as described herein. For example, according to some embodiments, upon receiving an attachment signal, the processor 730 may cause the display screen 706 to display a digital wallpaper that is related to the aesthetic element of the back housing 704. As another example, according to some embodiments, upon receiving a detachment signal, the processor 730 may cause the display screen 706 to stop displaying the digital wallpaper that is associated with the back housing 704.

As illustrated in FIG. 7, the back housing 704 can include a back display 705 that is configured to display an aesthetic element (such as, e.g., the aesthetic component 308 of FIG. 3). According to some embodiments, the aesthetic element displayed on the back display 705 can be dynamic (e.g., "live" or periodically changing). In such embodiments, the aesthetic information received in connection with the back housing 704 can include a plurality of images that corresponds to the images that are dynamically displayed on the back display 705. The aesthetic information may further include the order in which the plurality of images will be displayed on the back display 705 and the duration of each display. Accordingly, the processor 730 can use the aesthetic information to generate a digital wallpaper that displays each of the plurality of images as the corresponding image is being displayed on the back display 705. In short, a dynamic aesthetic component can trigger a dynamic digital wallpaper, according to some aspects.

According to other embodiments, the aesthetic element displayed on the back display 705 can be adjustable (e.g., replaced with a new image). For example, after a while, the user may become bored with a current back housing design. Rather than replacing the entire back housing component 704, such embodiments enable the user to change only the image that is displayed on the back display 705. According to some aspects, to adjust the displayed aesthetic element, the user may access a software application that is configured to facilitate communication with the back display 705 and/or the information device 712 of the back housing 604. The software application may be stored on the mobile computing device 700 and accessed directly via the device 700. Alternatively, the software application may be stored on a cloud server (e.g., remote computing device 819) and accessed indirectly via a mobile application (e.g., "app") stored on the mobile computing device 700. In either case, upon receiving user selection of a new aesthetic element for the back display 705, the software application may send corresponding aesthetic information to the back housing 704 and/or the mobile computing device 700. According to some embodiments, the aesthetic information may include an image file to be stored in the information device 712 (e.g., in the memory 714) and displayed as the newly-selected aesthetic element on the back display 705. According to other embodiments, the aesthetic information may include identifying information (e.g., an identifier) for storage in the ID tag 718. As described herein, the identifying information may be used, for example, to retrieve an image of the newly-selected aesthetic element from a remote database (e.g., back housing database 807).

Further, the aesthetic information received from the software application may be used to update the digital wallpaper in response to the newly-selected aesthetic element. For example, the processor 730 can use the aesthetic information provided by the software application to generate a new digital wallpaper in accordance with the new aesthetic element. As such, when the aesthetic element changes, the digital wallpaper may also change to reflect the new image. Similarly, the above-described software application may also be utilized to update the digital wallpaper in embodiments where the aesthetic element is affixed to the back housing 704 as a removable sticker or other embellishment (e.g., aesthetic component 508 of FIG. 5). As an example, when a new aesthetic component 508 is attached to the back housing 504, the user may access the software application to retrieve aesthetic information corresponding to the newly-attached aesthetic component 508. The retrieved information may be downloaded to the back housing 504 and/or the mobile computing device 500 and used to update the digital wallpaper 510 displayed on the display 506.

In FIG. 7, shown is the example mobile computing device 700 in which some embodiments may be implemented. As described above, the mobile computing device 700 can include the communication module 720, the camera 724 (e.g., camera 224 in FIG. 2), the processor 730, and the memory 740 (e.g., hard drives, flash memory, MicroSD cards, and others). Memory 740 can have a distributed architecture where various components are situated remote from one another, but are still accessed by processor 730. These other components may reside on devices located elsewhere on a network or in a cloud arrangement.

Further, the mobile computing device 700 can include a power module 742 (e.g., flexible batteries, wired or wireless charging circuits, etc.), a peripheral interface 725, and one or more external ports 735 (e.g., Universal Serial Bus (USB), HDMI, Firewire, and/or others). The communication module 720 can be configured to interface with the one or more external ports 735. For example, the communication module 720 can include one or more transceivers functioning in accordance with IEEE standards, 3GPP standards, or other standards, and configured to receive and transmit data via the one or more external ports 735. More particularly, the communication module 720 can include one or more WWAN transceivers configured to communicate with a wide area network including one or more cell sites or base stations to communicatively connect the mobile computing device 700 to additional devices or components. Further, the communication module 720 can include one or more WLAN and/or WPAN transceivers configured to connect the mobile computing device 700 to local area networks and/or personal area networks, such as a Bluetooth® network. Still further, the communication module 720 can include one or more point-to-point transceivers configured to connect the mobile computing device 700 to the information device 712, using short-range wireless technologies, such as, e.g., near-field-communication (NFC) and/or radio frequency identification (RFID).

The mobile computing device 700 can further include a display screen 706 (such as display screen 106), touch-sensitive components 745, and additional I/O components 750 (e.g., capacitors, keys, buttons, lights, LEDs, cursor control devices, haptic devices, and others). The display screen 706, touch-sensitive components 745, and the additional I/O components 750 may be considered to form portions of a user interface (e.g., portions of the mobile computing device 700 associated with presenting information to the user and/or receiving inputs from the user). In some embodiments, the display screen 706 is a touchscreen display using singular or combinations of display technologies such as electrophoretic displays, electronic paper, polyLED displays, OLED displays, AMOLED displays, liquid crystal displays, electrowetting displays, rotating ball displays, segmented displays, direct drive displays, passive-matrix displays, active-matrix displays, and/or others.

The mobile computing device 700 can further include one or more sensors 755 such as, for example, accelerometers, gyroscopic sensors (e.g., three angular-axis sensors), additional proximity sensors, tilt sensors, cameras, and/or other sensors; and an audio module 760 including hardware components such as a speaker 716 (e.g., speaker 216 in FIG. 2) for outputting audio and a microphone 765 for receiving audio. In some embodiments, the speaker 716 and the microphone 765 can be piezoelectric components. The mobile computing device 700 further includes an input/output (I/O) controller 770.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 730 (e.g., working in connection with an operating system) to implement a method for obtaining a digital wallpaper as described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Figure 9:
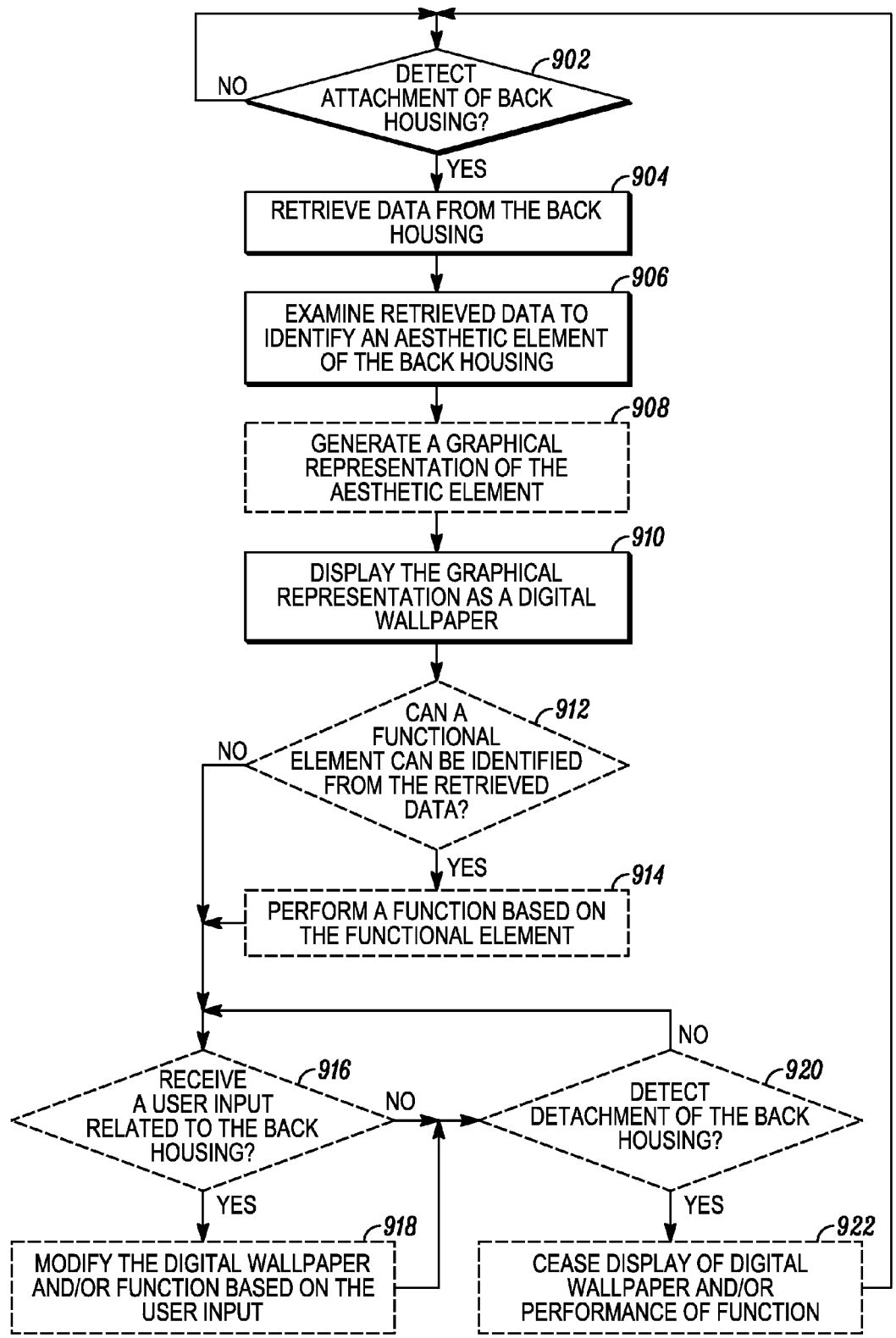
FIG. 9 is a flow diagram depicting control of example functions associated with a back housing of an electronic device in accordance with some embodiments.

FIG. 9 is a flowchart of a method 900 for controlling functions associated with a back housing that can be detachably coupled to an electronic device (such as the mobile computing device 100 and the back housing 104 shown in FIG. 1). The back housing can include an information component (such as the information device 712 shown in FIG. 7) and an aesthetic element (such as the aesthetic component 208 shown in FIG. 2A). According to some embodiments, the back housing can also include a functional aspect (such as the functional component 611 shown in FIG. 6A). More particularly, the method 900 relates to triggering the display of a digital wallpaper that corresponds to the aesthetic element of the back housing and/or triggering the performance of a function that relates to the functional aspect of the back housing, upon attachment of the back housing to the electronic device. The electronic device can include a memory (such as the memory 740 as shown in FIG. 7) and a processor (such as the processor 730 as shown in FIG. 7) that is configured to carry out the method steps described herein. According to some embodiments, the method steps may be implemented in software that is stored in the memory of the electronic device. The electronic device can further include a display screen (such as the display screen 306 shown in FIG. 3B) and an attachment sensor (such as the attachment sensor 722 as shown in FIG. 7) for detecting proximity and/or attachment of the back housing to the electronic device.

The method 900 can begin at step 902 with receipt of a first signal generated by the attachment sensor upon determining that the back housing is secured to a back side of the electronic device. Until the first signal is received, the method 900 may remain at step 902 and may periodically check for receipt of the first signal. At step 904, information (e.g., aesthetic, functional, and/or identifying information) may be retrieved from the back housing. According to some embodiments, the information retrieved from the back housing includes aesthetic and/or functional information, for example, where the aesthetic and/or functional information is stored in a memory of the back housing (e.g., the memory 714 of the back housing 704 as shown in FIG. 7). In other embodiments, the information retrieved from the back housing may include identifying information (e.g., an identifier), which can be used to locate aesthetic and/or functional information that is stored in a remote database (e.g., the back housing database 807 as shown in FIG. 8).

Step 906 includes examining the information retrieved from the back housing to identify an aesthetic element of the back housing. In embodiments where the aesthetic information is stored in the back housing, step 906 can include examining the retrieved aesthetic information to identify an image or graphical representation that is associated with the aesthetic element of the back housing (such as the aesthetic component 208 shown in FIG. 2A). According to embodiments where the aesthetic and/or functional information is stored remotely, step 906 can include examining the identifying information to determine a location of the aesthetic information in the remote database, and based on the aesthetic information that is downloaded from the remote database, identifying an image or graphical representation that is associated with the aesthetic element.

According to some embodiments, the aesthetic information retrieved, directly or indirectly, from the back housing can include an image file to be displayed as the digital wallpaper. The image file can be a copy, photograph, derivation, or other graphical representation of the aesthetic element of the back housing. In one example embodiment, the image file may be a two-dimensional representation of a three-dimensional aesthetic element (such as the aesthetic component 408 shown in FIG. 4A). In another example embodiment, the image file may be a photograph of the back of the aesthetic element. In yet another example embodiment, the image file may be a copy of the image file that was provided to the manufacturer to create the back housing. According to some embodiments, the image file extracted from the aesthetic information may be in a computer-readable format that can be displayed on the display screen as a digital wallpaper of the electronic device (e.g., JPEG, TIFF, BMP, PNG, etc.). According to other embodiments, the image file extracted from the aesthetic information may need to be converted to a displayable file format. For example, where the image file is a 3D model of the aesthetic element and the electronic device does not include the software required to display 3D model files, the image file may be converted to an appropriate two-dimensional file format.

Referring now to step 908, in some embodiments, the image file obtained from the aesthetic information may be modified, edited, or otherwise adjusted according to one or more predefined graphic settings prior to being displayed as the digital wallpaper. These predefined graphic settings can relate to color, size, brightness, sharpness, shape, pattern, and/or any other image attribute. For example, according to one embodiment, the predefined graphic settings can include creating a mirror image and/or or an inverted image of an image file that represents the aesthetic element.

Upon receiving the aesthetic information at step 906, the processor may determine whether one or more predefined graphic settings applies. The predefined graphic settings can be included in the aesthetic information that is retrieved, directly or indirectly, from the back housing. For example, upon receiving the information, the processor can examine the aesthetic information to identify any predefined graphic settings included therein. According to other embodiments, the predefined graphic settings can be stored in a memory of the electronic device, and the processor can be configured to retrieve the predefined graphic settings from the memory upon receiving the aesthetic information. If any predefined graphic settings are found, at step 908 a graphical representation of the aesthetic element can be generated according to the one or more predefined graphic settings, and at step 910, the generated graphical representation can be displayed as the digital wallpaper. If no applicable predefined graphic settings are found, or in embodiments that do not include predefined graphic settings, the method 900 can continue from step 906 directly to step 910, where the processor displays as the digital wallpaper the image that was included in the information retrieved from the back housing.

The method 900 can further include step 912, which includes determining whether a functional element can be identified from the information retrieved, directly or indirectly, from the back housing. For example, the processor can examine the retrieved information to determine whether the information includes functional information, and if it does, identify a functional element of the back housing (e.g., the functional component 611 of the back housing 604 as shown in FIG. 6) based thereon. If a functional element is identified (e.g., "yes") at step 912, at step 914 a function associated with the functional element may be performed by the processor. The function can include launching a software application (e.g., the health monitoring software that receives readings from the functional component 511 shown in FIG. 5), implementing a preset profile (e.g., the preset profile for configuring the audio player in accordance with the functional component 611 shown in FIG. 6), and/or executing any other set of instructions. The function may be included in the functional information retrieved, directly or indirectly, from the back housing. If a functional element is not identified (e.g., "no"), the method 900 continues directly to step 916.

Step 916 includes determining whether a user input related to the back housing has been received. The user input received at step 916 can relate to, for example, modification of the digital wallpaper that is displayed in associated with the back housing and/or modification of the function that is performed in association with the back housing. If a user input has been received (e.g., "yes"), the method 900 continues to step 918, which includes modifying the digital wallpaper and/or the function associated with the back housing based on the user input.

For example, the user input received in step 916 can include a selection to cancel the new digital wallpaper. In one example embodiment, for a predetermined time (e.g., five seconds, ten seconds, 15 seconds, etc.) after a new digital wallpaper is displayed, the user has the option of canceling, or selecting to opt-out of, the new digital wallpaper. If the user selects the cancel option, the new digital wallpaper may be removed from display and a previously displayed digital wallpaper may be displayed instead. According to one aspect, manual removal of the digital wallpaper associated with the back housing can cause automatic termination of the functions that are being performed in connection with the back housing. In one embodiment, the user may be provided with an option to keep the function active after removing the digital wallpaper that is associated with the back housing. As another example, the user input received in step 916 can include a selection to modify or edit the digital wallpaper after it is displayed. The user may want to change, for example, the size, proportions, colors, brightness, sharpness, or any other setting of the image being displayed as the digital wallpaper. In some embodiments, the user input received at step 916 can modify one or more of the predefined graphic settings that were applied in step 908.

As another example, the user input received at the step 916 can include a selection to modify one or more settings of the software application and/or preset profile that was launched upon attachment of the back housing. For example, referring back to FIG. 5, the user may adjust the settings of the health monitoring software application so that the application is running in the background, rather than the foreground. In some embodiments, the user input received at step 916 can include a selection to close the software application that was launched upon attachment of the back housing. For example, referring back to FIG. 6, after the user is done listening to music, the user may choose to close the audio player application, even though the back housing 604 is still attached to the mobile computing device 600. According to one aspect, manual termination of a function associated with the back housing can cause automatic removal of the digital wallpaper that is being displayed in connection with the back housing. In one embodiment, the user may be provided with an option to keep the digital wallpaper intact after terminating the function.

After the modification in step 918, or if a user input is not received at step 916 (e.g., "no"), the method 900 can continue to step 920, which includes determining whether detachment of the back housing has been detected. If detachment of the back housing has been detected (e.g., "yes"), at step 922 display of the digital wallpaper associated with the back housing may cease, and any function that is being performed in association with the back housing may also be terminated. In some embodiments, the user can be presented with an option to retain the digital wallpaper even though the associated back housing has been detached. For example, the option to retain the digital wallpaper may be displayed for a predetermined amount of time (e.g., five seconds, ten seconds, fifteen seconds, etc.). From step 922, the method 900 can loop back to step 902 and wait for attachment of a back housing.

If detachment is not detected (e.g., "no") at step 920, the method 900 can loop back to step 916. As will be appreciated, as long as a user input related to the back housing is not received and detachment of the back housing is not detected, the method 900 can continue to loop between steps 916 and 920, the digital wallpaper that is associated with the back housing can continue to be displayed, and the function associated with the back housing can continue to be performed.

Thus, it should be clear from the preceding disclosure that the methods and systems described herein provide for automatic correlation between a digital wallpaper displayed on an electronic device and the aesthetic design of a back housing component that is attached to the electronic device. Further, according to some aspects, the methods and system described herein provide for automatic performance of one or more functions upon detecting attachment of the back housing to the electronic device, the function being related to a built-in functionality of the back housing.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A method in an electronic device for automatically obtaining a digital wallpaper, the method comprising:
    detecting attachment of a back housing to a front housing of the electronic device;
    upon detecting the attachment of the back housing to the front housing:
        retrieving information from the back housing,
        examining the retrieved information to identify (i) an aesthetic element of the back housing, (ii) a physical functional component of the back housing, and (iii) a set of commands, included in the retrieved information, to implement a preset profile within an application of the electronic device, the preset profile associated with the physical functional component of the back housing,
        displaying a graphical representation of the aesthetic element as a digital wallpaper of the electronic device, and
        automatically executing the set of commands to launch the application with the preset profile implemented therein, the application (i) stored on the electronic device, (ii) executed by the electronic device, and (iii) using data associated with the physical functional component;
    detecting detachment of the back housing from the front housing; and
    upon detecting the detachment of the back housing from the front housing:
        ceasing display of the graphical representation as the digital wallpaper of the electronic device, and
        exiting the application.

2. The method of claim 1, further comprising:
    generating the graphical representation of the aesthetic element according to one or more predefined graphic settings.

3. The method of claim 2, wherein the predefined graphic settings include creating a mirror image of a representation of the aesthetic element of the back housing.

4. The method of claim 2, wherein the predefined graphic settings include creating an inverted image of a representation of the aesthetic element of the back housing.

5. The method of claim 2, further comprising:
    receiving a user input related to the digital wallpaper; and
    modifying the digital wallpaper based on the user input.

6. The method of claim 1, further comprising:
    changing one or more predefined settings of the application.

7. An electronic device configured to automatically obtain a digital wallpaper, the electronic device comprising:
    a back housing releasably engaged to a front housing and having an information component and a physical functional component;
    a display disposed at least partially within the front housing and configured to display a digital wallpaper;
    a sensor disposed within the front housing and configured to detect (i) attachment of the back housing to the front housing and (ii) detachment of the back housing from the front housing, the sensor transmitting (i) an attachment signal upon detecting the attachment of the back housing and (ii) a detachment signal upon detecting the detachment of the back housing; and
    a processor disposed within the front housing and in communication with the display, the sensor, and the information component of the back housing, the processor being configured to:
        receive the attachment signal transmitted by the sensor,
        upon receiving the attachment signal transmitted by the sensor:
            retrieve data about the back housing from the information component of the back housing, the data including a set of commands to implement a preset profile within an application of the electronic device, the preset profile associated with the physical functional component of the back housing, retrieve functional data associated with the back housing from the physical functional component of the back housing, examine the retrieved data to identify an aesthetic component of the back housing, cause the display to display a graphical representation of the aesthetic component as a digital wallpaper of the electronic device, and automatically execute the set of commands to launch the application with the preset profile implemented therein, the application (i) stored on the electronic device, (ii) executed by the processor, and (iii) using the functional data retrieved from the physical functional component, receive the detachment signal transmitted by the sensor, and upon receiving the detachment signal transmitted by the sensor:

cause the display to cease display of the graphical representation as the digital wallpaper of the electronic device, and exit the application.

8. The electronic device of claim 7, further comprising:
a communication module disposed at least partially within the front housing and including a short-range communication module configured to support the sensor.

9. The electronic device of claim 8, wherein the information component is a memory that stores data about the back housing, and the communication module includes at least one of a Bluetooth transceiver or an NFC transceiver.

10. The electronic device of claim 8, wherein the information component is an identification tag that includes an identifier assigned to the back housing, and the processor uses the identifier to retrieve, from a database, information about the back housing.

11. The electronic device of claim 10, wherein the identification tag is a Radio Frequency Identification (RFID) tag, and the communication module includes an RFID reader.

12. The electronic device of claim 10, wherein the identification tag is a Near Field Communication (NFC) tag, and the communication module includes an NFC transceiver.

13. The electronic device of claim 10, wherein the database includes at least one of information identifying the aesthetic component of the back housing and information identifying the physical functional component of the back housing.

14. The electronic device of claim 10, wherein the database is stored on a remote computer, and the communication module further comprises a long-range communication module configured to enable communication between the processor and the remote computer.

15. The electronic device of claim 7, wherein the sensor is a proximity sensor.

16. The electronic device of claim 15, wherein the sensor is a Hall-effect sensor.

17. The electronic device of claim 7, wherein the display includes a user interface configured to receive a user input related to the digital wallpaper, and the processor is further configured to modify the digital wallpaper based on the received user inputs.

* * * * *